(12) United States Patent
Cristadoro et al.

(10) Patent No.: US 9,676,915 B2
(45) Date of Patent: Jun. 13, 2017

(54) POROUS BRANCHED/HIGHLY BRANCHED POLYIMIDES

(71) Applicant: BASF SE, Ludwigshafen (DE)

(72) Inventors: Anna Cristadoro, Raleigh, NC (US); Raimund Pietruschka, Ebertsheim (DE); Marc Fricke, Osnabrueck (DE); Mark Elbing, Bremen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/104,135

(22) Filed: Dec. 12, 2013

(65) Prior Publication Data

US 2014/0171526 A1 Jun. 19, 2014

Related U.S. Application Data

(60) Provisional application No. 61/737,848, filed on Dec. 17, 2012.

(51) Int. Cl.
*C08J 9/28* (2006.01)
*C08G 73/10* (2006.01)

(52) U.S. Cl.
CPC .......... *C08J 9/286* (2013.01); *C08G 73/1035* (2013.01); *C08J 2201/0502* (2013.01); *C08J 2379/08* (2013.01)

(58) Field of Classification Search
None
See application file for complete search history.

(56) References Cited

U.S. PATENT DOCUMENTS

| | | | |
|---|---|---|---|
| 2,155,687 A | 4/1939 | Schauer et al. | |
| 3,277,177 A | 10/1966 | Wenham et al. | |
| 3,562,189 A * | 2/1971 | Farrissey et al. | 521/121 |
| 4,520,071 A * | 5/1985 | Noda et al. | 428/402 |
| 7,074,880 B2 | 7/2006 | Rhine et al. | |
| 2004/0132845 A1 | 7/2004 | Rhine et al. | |
| 2005/0131163 A1 | 6/2005 | Rhine et al. | |
| 2006/0039984 A1 * | 2/2006 | Nakanishi et al. | 424/489 |
| 2012/0134909 A1 | 5/2012 | Leventis et al. | |
| 2012/0220679 A1 | 8/2012 | Fricke et al. | |
| 2012/0235070 A1 | 9/2012 | Fricke et al. | |
| 2012/0248125 A1 | 10/2012 | Fricke et al. | |
| 2013/0052393 A1 | 2/2013 | Hahn et al. | |
| 2013/0118980 A1 | 5/2013 | Mueller-Cristadoro et al. | |
| 2013/0203898 A1 | 8/2013 | Mueller-Cristadoro et al. | |
| 2014/0042356 A1 | 2/2014 | Mueller-Cristadoro et al. | |
| 2014/0045070 A1 | 2/2014 | Mueller-Cristadoro et al. | |
| 2014/0171526 A1 | 6/2014 | Cristadoro et al. | |
| 2015/0210804 A1 | 7/2015 | Mueller-Cristadoro et al. | |
| 2015/0214526 A1 | 7/2015 | Cristadoro et al. | |

FOREIGN PATENT DOCUMENTS

| | | |
|---|---|---|
| WO | WO 95/02009 A1 | 1/1995 |
| WO | WO 2008/138978 A1 | 11/2008 |
| WO | WO 2012/113759 A1 | 8/2012 |
| WO | WO 2012/126742 A1 | 9/2012 |
| WO | WO 2012/130779 A2 | 10/2012 |
| WO | WO 2012/156903 A1 | 11/2012 |
| WO | WO 2013/030020 A1 | 3/2013 |
| WO | WO 2013/072224 A1 | 5/2013 |
| WO | WO 2013/113587 A1 | 8/2013 |
| WO | WO 2014/023796 A1 | 2/2014 |

OTHER PUBLICATIONS

U.S. Appl. No. 14/033,708, filed Sep. 23, 2013, Fricke, et al.
U.S. Appl. No. 14/070,874, filed Nov. 4, 2013, Fricke, et al.
Extended European Search Report issued Mar. 21, 2013 in Patent Application No. 12197478.6.
Chakkaravarthy Chidambareswarapattar, et al., "One-step room-temperature synthesis of fibrous polyimide aerogels from anhydrides and isocyanates and conversion to isomorphic carbons" Journal of Materials Chemistry, vol. 20, 2010, pp. 9666-9678.
Espacenet—INPADOC Patent Family, Family List: US2014045070 (A1), pp. 1-2.

* cited by examiner

*Primary Examiner* — Ana Woodward
(74) *Attorney, Agent, or Firm* — Oblon, McClelland, Maier & Neustadt, L.L.P.

(57) ABSTRACT

The present invention relates to a process for the preparation of porous particles comprising at least one polyimide by reacting (A) at least one polyisocyanate having on average at least two isocyanate groups per molecule and (B) at least one polycarboxylic acid having at least two COOH groups per molecule or anhydride thereof, in the presence of at least one solvent, optionally at least one catalyst and optionally at least one further additive, to cause precipitation of a polyimide in the solvent to form the porous particles, to porous particles, obtained with this process, to parts, bodies, foams and/or material comprising these porous particles, and to the use of the porous particles or of the parts, bodies, foams and/or material as insulation material and in vacuum insulation.

16 Claims, No Drawings

POROUS BRANCHED/HIGHLY BRANCHED POLYIMIDES

The present invention relates to a process for the preparation of porous particles comprising at least one polyimide by reacting at least one polyisocyanate having on average at least two isocyanate groups per molecule and at least one polycarboxylic acid having at least two COOH groups per molecule or anhydride thereof, in the presence of at least one solvent, optionally at least one catalyst and optionally at least one further additive, to cause precipitation of a polyimide in the solvent to form the porous particles.

The invention further relates to the porous particles which can be obtained in this way and the use of the porous particles as insulation material and in vacuum insulation panels.

Porous particles, for example polymer foams, having pores in the size range of a few microns or significantly below and a high porosity of at least 70% are particularly good thermal insulators on the basis of theoretical considerations.

Such porous materials having a small average pore diameter can be, for example, in the form of organic xerogels. In the literature, the term xerogel is not used entirely uniformly. In general, a xerogel is considered to be a porous material which has been produced by a sol-gel process, with the liquid phase having been removed from the gel by drying below the critical temperature and below the critical pressure of the liquid phase ("subcritical conditions"). In contrast, the term aerogels generally refers to gels obtained when the removal of the liquid phase from the gel has been carried out under supercritical conditions.

WO 95/02009 discloses isocyanate-based xerogels which are particularly suitable for applications in the field of vacuum insulation. The publication also discloses a sol-gel-based process for producing the xerogels, in which known, inter alia aromatic, polyisocyanates and an unreactive solvent are used. As further compounds having active hydrogen atoms, use is made of aliphatic or aromatic polyamines or polyols. An example is disclosed in which a polyisocyanate is reacted with diaminodiethyltoluene to obtain porous material of polyurea. The xerogels disclosed generally have average pore sizes in the region of 50 µm.

WO 2008/138978 discloses xerogels which comprise a polyurea made of from 30 to 90% by weight of at least one polyfunctional isocyanate and from 10 to 70% by weight of at least one polyfunctional aromatic amine and having a volume average pore diameter of not more than 5 microns.

U.S. Pat. No. 7,074,880 B2 discloses polyimide aerogels that are based on the reaction of one dianhydride with a polyamine.

A process for the preparation of polyimide fibrous aerogels is disclosed in Ch. Chidambareswarapattar et al. J. Mater. Chem., 2010, 20, pages 9666 to 9678. According to this document polyimide fibrous aereogels are prepared using a diisocyanate and a dianhydride.

However, the syntheses of polyimide aereogels that are disclosed in the prior art are based on the reaction of polyamines and dianhydrides yielding a polyamic acid that is further imidized which is done chemically or thermally. Suitable solvents for the imidization are high-boiling solvent such as N-Methylpyrrolidone (NMP), which are difficult to be removed afterwards.

Furthermore, the reaction of di- or polyamines and dianhydrides is relatively slow. In the absence of a catalyst this reaction does not yield imide groups, but just of polyamic acid is formed.

It was therefore an object of the invention to provide porous materials, that, compared to the prior art, have improved thermal conductivity in vacuo. In addition, the porous materials should have a low thermal conductivity even at pressures above the vacuum range, in particular in a pressure range from about 1 mbar to about 100 mbar. This is desirable since an increase in pressure occurs over time in vacuum panels. Furthermore, the porous material should at the same time have a high porosity, a low density and a sufficiently high mechanical stability.

A further object of the present invention is to provide a process for the preparation of porous particles that can be conducted very easily, in particular by using at least one solvent that can be removed easily after the reaction, for example by evaporation.

Finally, mixing defects and thus the heterogeneities in the structure and the materials properties of the porous materials formed in the reaction of the isocyanates with the carboxylic acids or anhydride thereof should be avoided.

We have accordingly found the process of the invention and the porous materials which can be obtained in this way.

The present invention therefore relates to a process for the preparation of porous particles comprising at least one polyimide by reacting (A) at least one polyisocyanate having on average at least two isocyanate groups per molecule and (B) at least one polycarboxylic acid having at least two COOH groups per molecule or anhydride thereof, in the presence of at least one solvent, optionally at least one catalyst and optionally at least one further additive, to cause precipitation of a polyimide in the solvent to form the porous particles.

The porous particles comprising at least one polyimide are obtained by reacting at least one polyisocyanate having on average at least two isocyanate groups per molecule and at least one polycarboxylic acid having at least two COOH groups per molecule or anhydride thereof according to the present invention. It will be obvious to a person skilled in the art that the monomer components mentioned are present in reacted form in the porous material.

For the purposes of the present invention, the functionality of a compound is the number of reactive groups per molecule. In the case of the monomer component (A), the functionality is the number of isocyanate groups per molecule. In the case of the carboxylic acid groups or anhydride thereof of the monomer component (B), the functionality is the number of reactive carboxylic acid groups or anhydride thereof per molecule. A polyfunctional compound has a functionality of at least 2.

If mixtures of compounds having different numbers of functionalities are used as component (A) and/or (B), the number of functionality of the components is in each case given by the number average of the functionalities of the individual compounds.

Component (A)

In the process according to the present invention, at least one polyfunctional isocyanate having on average at least two isocyanate groups per molecule is reacted as component (A).

In the process of the invention, the amount of component (A) used is preferably from 1 to 50% by weight, in particular from 5 to 30% by weight, particularly preferably from 10 to 25% by weight, in each case based on the total weight of the components (A) and (B), solvent and optionally further components that may be present, which is 100% by weight.

Possible polyfunctional isocyanates having on average more than two isocyanate groups are aromatic, aliphatic, cycloaliphatic and/or araliphatic isocyanates. Such polyfunctional isocyanates are known per se or can be prepared by methods known per se. The polyfunctional isocyanates can also be used, in particular, as mixtures, so that the component (A) in this case comprises various polyfunctional isocyanates. Polyfunctional isocyanates which are possible as monomer building blocks (A) have two (hereinafter referred to as diisocyanates) or more than two isocyanate groups per molecule of the monomer component.

According to the present invention, polyisocyanate (a) can be selected form any suitable polyisocyanate having on average at least two isocyanate groups, which may be present capped or in free form. Preference is given to trimeric, oligomeric or polymeric diisocyanates, for example oligomeric hexamethylene diisocyanate, oligomeric isophorone diisocyanate, oligomeric toluylene diisocyanate, oligomeric diphenylmethane diisocyanate—so called polymeric-MDI—and mixtures thereof. For example, so called trimeric hexamethylene diisocyanate is in many cases not present as pure trimeric diisocyanate, but as a polyisocyanate having a functionality on average of 3.6 to 4 NCO-groups per molecule. Same applies to oligomeric tetramethylene diisocyanate and oligomeric isophorone diisocyanate.

According to one preferred embodiment of the present invention the at least one polyisocyanate having on average at least two isocyanate groups per molecule is a mixture of at least one diisocyanate and at least one triisocyanate or a polyisocyanat having at least 4 isocyanate groups in the molecule.

As at least one isocyanate (A), preference is given to aromatic isocyanates. Particularly preferred polyfunctional isocyanates as component (A) are the following embodiments:

a1) polyfunctional isocyanates based on tolylene diisocyanate (TDI), in particular 2,4-TDI or 2,6-TDI or mixtures of 2,4- and 2,6-TDI;
a2) polyfunctional isocyanates based on diphenylmethane diisocyanate (MDI), in particular 2,2'-MDI or 2,4'-MDI or 4,4'-MDI or oligomeric MDI, also referred to as polyphenylpolymethylene isocyanate, or mixtures of two or three of the abovementioned diphenylmethane diisocyanates or crude MDI which is obtained in the production of MDI or mixtures of at least one polymer of MDI and at least one of the abovementioned low molecular weight MDI derivatives;
a3) mixtures of at least one aromatic isocyanate according to embodiment a1) and at least one aromatic isocyanate according to embodiment a2).

Polymeric diphenylmethane diisocyanate is particularly preferred as polyfunctional isocyanate. Polymeric diphenylmethane diisocyanate (hereinafter referred to as oligomeric MDI) is a condensation product or a mixture of a plurality of oligomeric and/or polymeric condensation products and thus a derivative/derivatives of diphenylmethane diisocyanate (MDI). The polyfunctional isocyanates can preferably also be made up of mixtures of monomeric aromatic diisocyanates and polymeric MDI.

Polymeric MDI comprises one or more condensation products of MDI which have a plurality of rings and a functionality of more than 2, in particular 3 or 4 or 5. Polymeric MDI (PMDI) is known and is frequently referred to as polyphenylpolymethylene isocyanate or as oligomeric MDI. Polymeric MDI is usually made up of a mixture of MDI-based isocyanates having various functionalities. Polymeric MDI is usually used in admixture with monomeric MDI.

The (average) functionality of an isocyanate comprising polymeric MDI can vary in the range from about 2.2 to about 5, in particular from 2.4 to 3.5, in particular from 2.5 to 3. Such a mixture of MDI-based polyfunctional isocyanates having various functionalities is, in particular, crude MDI which is obtained in the production of MDI.

In an embodiment of the present invention, polyisocyanate (a) is used in a mixture with at least one diisocyanate, for example with toluylene diisocyanate, hexamethylene diisocyanate or with isophorone diisocyanate. In a particular variant, polyisocyanate (a) is used in a mixture with the corresponding diisocyanate, for example trimeric HDI with hexamethylene diisocyanate or trimeric isophorone diisocyanate with isophorone diisocyanate or polymeric diphenylmethane diisocyanate (polymer MDI) with diphenylmethane diisocyanate.

Polyfunctional isocyanates or mixtures of a plurality of polyfunctional isocyanates based on MDI that are preferably used according to the present invention are known and are marketed, for example, by BASF Polyurethanes GmbH under the tradename Lupranat®.

The functionality of the component (A) is preferably on average more than two, in particular at least 2.2 and particularly preferably at least 2.5. The functionality of the component (A) is preferably from 2.2 to 4 and particularly preferably from 2.5 to 3.

The content of isocyanate groups in the component (A) is preferably from 5 to 15 mmol/g, in particular from 6 to 9 mmol/g, particularly preferably from 7 to 8.5 mmol/g, in respect of component A in each case. A person skilled in the art will know that the content of isocyanate groups in mmol/g and the equivalent weight in g/equivalent have a reciprocal relationship. The content of isocyanate groups in mmol/g can be derived from the content in % by weight in accordance with ASTM D-5155-96 A.

In a preferred embodiment, the component (A) comprises at least one polyfunctional isocyanate selected from among diphenylmethane 4,4'-diisocyanate, diphenylmethane 2,4'-diisocyanate, diphenylmethane 2,2'-diisocyanate and oligomeric diphenylmethane diisocyanate. In this preferred embodiment, the component (A) particularly preferably comprises polymeric diphenylmethane diisocyanate, preferably polymeric 4,4'-diphenylmethane diisocyanate, —so called polymeric MDI—and has a functionality of at least 2.2, for example 2.2 to 2.8.

The viscosity of component (A) used can vary within a wide range. Component (A) preferably has a viscosity of from 100 to 3000 mPa·s, particularly preferably from 150 to 2500 mPa·s.

Component (B)

According to the process of the present invention, as component (B) at least one polycarboxylic acid having at least two carboxylic acid groups or anhydride thereof is reacted with component (A) as mentioned above.

As component (B) polycarboxylic acids, for example aliphatic, or preferably aromatic, polycarboxylic acids are selected that have at least two, more preferably at least three carboxylic acid (COOH) groups per molecule, or the relevant anhydrides, preferably if they are present in low-molecular weight, that is to say non-polymeric, form. Such polycarboxylic acids having at least three, preferably three, COOH groups in which two carboxylic acids groups are present as anhydride and the third as a free carboxylic acid are also comprised.

In a preferred embodiment of the present invention, as polycarboxylic acid (B), a polycarboxylic acid having at least 4 COOH groups per molecule, or the relevant anhydride, is selected.

Examples of polycarboxylic acids (B) and anhydrides thereof are selected from the group consisting of 1,2,3-benzenetricarboxylic acid, 1,2,3-benzenetricarboxylic dianhydride, 1,3,5-benzenetricarboxylic acid (trimesic acid), preferably 1,2,4-benzenetricarboxylic acid (trimellitic acid), trimellitic anhydride and, in particular, 1,2,4,5-benzenetetracarboxylic acid (pyromellitic acid) and 1,2,4,5-benzenetetracarboxylic dianhydride (pyromellitic dianhydride), 3,3',4,4''-benzophenonetetracarboxylic acid, 3,3',4,4''-benzophenonetetracarboxylic dianhydride, in addition benzenehexacarboxylic acid (mellitic acid) and anhydrides of mellitic acid, and mixtures thereof.

The present invention therefore preferably relates to the process according to the present invention, wherein the at least one polycarboxylic acid having at least two carboxylic acid groups per molecule or anhydride thereof are selected from the group consisting of 1,2,3-benzenetricarboxylic acid, 1,2,3-benzenetricarboxylic dianhydride, 1,3,5-benzenetricarboxylic acid (trimesic acid), 1,2,4-benzenetricarboxylic acid (trimellitic acid), trimellitic anhydride, 1,2,4,5-benzenetetracarboxylic acid (pyromellitic acid), 1,2,4,5-benzenetetracarboxylic dianhydride (pyromellitic dianhydride), 3,3',4,4''-benzophenonetetracarboxylic acid, 3,3',4,4''-benzophenonetetracarboxylic dianhydride, benzenehexacarboxylic acid (mellitic acid), anhydrides of mellitic acid, and mixtures thereof.

Other suitable polycarboxylic acids (B) and anhydrides thereof are mellophanic acid and mellophanic anhydride, 1,2,3,4-benzenetetracarboxylic acid and 1,2,3,4-benzenetetracarboxylic dianhydride, 3,3,4,4-biphenyltetracarboxylic acid and 3,3,4,4-biphenyltetracarboxylic dianhydride, 2,2,3,3-biphenyltetracarboxylic acid and 2,2,3,3-biphenyltetracarboxylic dianhydride, 1,4,5,8-naphthalenetetracarboxylic acid and 1,4,5,8-naphthalenetetracarboxylic dianhydride, 1,2,4,5-naphthalenetetracarboxylic acid and 1,2,4,5-naphthalenetetracarboxylic dianhydride, 2,3,6,7-naphthalenetetracarboxylic acid and 2,3,6,7-naphthalenetetracarboxylic dianhydride, 1,4,5,8-decahydronaphthalenetetracarboxylic acid and 1,4,5,8-decahydronaphthalenetetracarboxylic dianhydride, 4,8-dimethyl-1,2,3,5,6,7-hexahydronaphthalene-1,2,5,6-tetracarboxylic acid and 4,8-dimethyl-1,2,3,5,6,7-hexahydronaphthalene-1,2,5,6-tetracarboxylic dianhydride, 2,6-dichloronaphthalene-1,4,5,8-tetracarboxylic acid and 2,6-dichloronaphthalene-1,4,5,8-tetracarboxylic dianhydride, 2,7-dichloronaphthalene-1,4,5,8-tetracarboxylic acid and 2,7-dichloronaphthalene-1,4,5,8-tetracarboxylic dianhydride, 2,3,6,7-tetrachloronaphthalene-1,4,5,8-tetracarboxylic acid and 2,3,6,7-tetrachloronaphthalene-1,4,5,8-tetracarboxylic dianhydride, 1,3,9,10-phenanthrenetetracarboxylic acid and 1,3,9,10-phenanthrenetetracarboxylic dianhydride, 3,4,9,10-perylenetetracarboxylic acid and 3,4,9,10-perylenetetracarboxylic dianhydride, bis(2,3-dicarboxyphenyl)methane and bis(2,3-dicarboxyphenyl)methane dianhydride, bis(3,4-dicarboxyphenyl)methane and bis(3,4-dicarboxyphenyl)methane dianhydride, 1,1-bis(2,3-dicarboxyphenyl)ethane and 1,1-bis(2,3-dicarboxyphenyl)ethane dianhydride, 1,1-bis(3,4-dicarboxyphenyl)ethane and 1,1-bis(3,4-dicarboxyphenyl)ethane dianhydride, 2,2-bis(2,3-dicarboxyphenyl)propane and 2,2-bis(2,3-dicarboxyphenyl)propane dianhydride, 2,3-bis(3,4-dicarboxyphenyl)propane and 2,3-bis(3,4-dicarboxyphenyl)propane dianhydride, bis(3,4-carboxyphenyl)sulfone and bis(3,4-carboxyphenyl)sulfone dianhydride, bis(3,4-carboxyphenyl)ether and bis(3,4-carboxyphenyl)ether dianhydride, ethylenetetracarboxylic acid and ethylenetetracarboxylic dianhydride, 1,2,3,4-butanetetracarboxylic acid and 1,2,3,4-butanetetracarboxylic dianhydride, 1,2,3,4-cyclopentanetetracarboxylic acid and 1,2,3,4,-cyclopentanetetracarboxylic dianhydride, 2,3,4,5-pyrrolidinetetracarboxylic acid and 2,3,4,5-pyrrolidinetetracarboxylic dianhydride, 2,3,5,6-pyrazinetetracarboxylic acid and 2,3,5,6-pyrazinetetracarboxylic dianhydride, 2,3,4,5-thiophenetetracarboxylic acid and 2,3,4,5-thiophenetetracarboxylic dianhydride.

In one embodiment of the present invention, anhydrides that are disclosed in U.S. Pat. Nos. 2,155,687 or 3,277,117 are used in the process according to the present invention.

If polyisocyanate (A) and polycarboxylic acid (B) are condensed with one another according to the present invention—preferably in the presence of a catalyst—an imide group is formed with the elimination of $CO_2$ and $H_2O$. If, instead of polycarboxylic acid (B), the corresponding anhydride is used, an imide group is formed with elimination of $CO_2$.

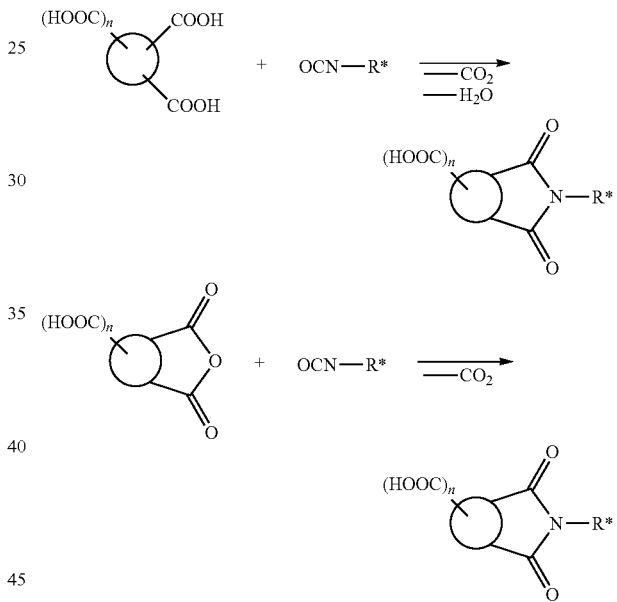

In these formulae R* is the polyisocyanate (A) radical that is not specified further in the above reaction equation, and n is a number greater than or equal to 1, for example 1 in the case of a tricarboxylic acid or 2 in the case of a tetracarboxylic acid, where $(HOOC)_n$ may be replaced by an anhydride group of the formula $C(=O)-O-C(=O)$.

In one embodiment of the present invention, polycarboxylic acid (B) is used in a mixture with at least one dicarboxylic acid or with at least one dicarboxylic anhydride, for example with phthalic acid or phthalic anhydride.

In the process of the invention, the amount of component (B) used is preferably from 1 to 30% by weight, in particular from 1 to 20% by weight, particularly preferably from 1 to 10% by weight, in each case based on the total weight of the components (A) and (B), solvent and optionally further components that may be present, which is 100% by weight.

The polyimide that is obtained by reacting components (A) and (B) according to the present invention can have at least two imide groups per molecule, preferably at least 3 imide groups per molecule.

In an embodiment of the present invention, the polyimide that is obtained by reacting components (A) and (B) according to the present invention, in addition to imide groups which form the polymer backbone, has terminally or as side chains, in addition, at least three, preferably at least six, more preferably at least ten, functional groups. Terminal or side-chain functional groups in the polyimide that is obtained by reacting components (A) and (B) according to the present invention are preferably anhydride groups or acid groups and/or free or capped NCO groups. The polyimide that is obtained by reacting components (A) and (B) according to the present invention preferably has no more than 500 terminal or side-chain functional groups, preferably no more than 100.

Alkyl groups such as, for example, methyl groups, are therefore not a branching of a polyimide according to the invention.

In an embodiment of the present invention, the polyimide that is obtained before the precipitation starts according to the invention is a hyperbranched polyimide. "Hyperbranched", in the context of the present invention, is taken to mean that the degree of branching (DB), that is to say the medium number of dendritic links plus the medium number of end groups per molecule, divided by the sum of the medium number of dendritic, linear and terminal links, multiplied by 100, is 10 to 99.9%, preferably 20 to 99%, particularly preferably 20 to 95%. "Dendrimer", in the context of the present invention, is taken to mean that the degree of branching is 99.9-100%. For the definition of "degree of branching" see H. Frey et al., Acta Polym. 1997, 48, 30.

The process according to the present invention is conducted in the presence of at least one solvent causing that the at least one polyimide is prepared to at least one certain molecule weight at which precipitation and crosslinking of said polyimide is caused.

In general, any solvent that is known to the skilled artisan in which the at least one polyimide precipitates, can be used according to the present invention.

According to a preferred embodiment of the present invention the at least one solvent is selected from the group consisting of ketones, for example acetone, methyl ethyl ketone (MEK), methyl isobutyl ketone (MIBK) or acetophenone, aromatic compounds, for example mono- and dichlorobenzene, xylene, phenol or cresol, glycols, for example ethylene glycol, esters, for example monoethyl ether acetate, derivatives of pyrrolidone, for example N-methylpyrrolidone (NMP) or N-ethylpyrrolidone, amides, for example dimethylformamide or dimethylacetamide, sulfur comprising compounds, for example dimethyl sulfoxide or dimethyl sulphones, and mixtures of two or more thereof.

According to a preferred embodiment of the present invention the solvent is selected from the groups consisting of acetone, monoethyl ether acetate, methyl ethyl ketone (MEK), methyl isobutyl ketone (MIBK), acetophenone, N-methylpyrrolidone (NMP) and mixtures thereof. Acetone is particularly preferred.

The solvent is used in an amount of 1 to 20 ml/g reactants, preferably 1 to 10 ml/g reactants, most preferably 1 to 5 ml/g reactants in each case based on the sum of at least one polyisocyanate (A) and at least one polycarboxylic acid or anhydride (B).

In the process of the invention, the amount of the at least solvent used is preferably from 30 to 95% by weight, in particular from 50 to 90% by weight, particularly preferably from 60 to 80% by weight, in each case based on the total weight of the components (A) and (B), solvent and optionally further components that may be present, which is 100% by weight.

Within to the process according to the present invention the concentration of the at least one polyisocyanate having on average at least two isocyanate groups per molecule in the solvent is preferably 0.01 to 0.6 mol/l, more preferably 0.1 to 0.5 mol/l, most preferably 0.1 to 0.3 mol/l.

Within to the process according to the present invention the concentration of the at least one polycarboxylic acid having at least two COOH groups per molecule or anhydride thereof in the solvent is preferably 0.05 to 2.0 mol/l, more preferably 0.1 to 1.0 mol/l, most preferably 0.1 to 0.8 mol/l.

The process according to the present invention is preferably conducted in the presence of at least one catalyst as a further component. As catalysts, in particular water and Brønsted bases are suitable, for example alkalimetal alcoholates, in particular alkanolates of sodium or potassium, for example sodium methanolate, sodium ethanolate, sodium phenolate, potassium methanolate, potassium ethanolate, potassium phenolate, lithium methanolate, lithium ethanolate and lithium phenolate.

In the process of the invention, the amount of the at least catalyst used is preferably from 0.005 to 10% by weight, in particular from 0.01 to 5% by weight, particularly preferably from 0.05 to 4% by weight, in each case based on the total weight of the components (A) and (B), solvent and optionally further components that may be present, which is 100% by weight.

The reaction mixture that is used within the process according to the present invention may comprises further components, for example selected from the group consisting of silicone stabilizers such as silicone polyether copolymers like DC 193, DC190 that are known to the skilled artisan and mixtures thereof.

In the process of the invention, the amount of the at least further component used is preferably from 0.05 to 5% by weight, in particular from 0.1 to 2% by weight, particularly preferably from 0.1 to 1% by weight, in each case based on the total weight of the components (A) and (B), solvent and optionally further components that may be present, which is 100% by weight.

For carrying out the synthesis method according to the invention, at least one polyisocyanate (A) and polycarboxylic acid or anhydride (B) can be used in a quantitative ratio such that the molar fraction of NCO groups to COOH groups is in the range from 1:3 to 3:1, preferably 1:2 to 2:1. In this case, one anhydride group of the formula CO—O—CO counts as two COOH groups.

In an embodiment of the present invention, the synthesis method according to the invention can be carried out at temperatures in the range from 10 to 200° C., preferably 20 to 120° C., particularly preferably 20 to 100° C.

Therefore, the present invention preferably relates to the process as mention above, wherein wherein the reaction is conducted at a temperature of 10 to 200° C., more preferably 20 to 120° C., most preferably 20 to 100° C.

In an embodiment of the present invention, the process according to the present invention can be carried out at atmospheric pressure. However, the process can also be conducted under pressure, for example at pressures in the range from 1.1 to 10 bar.

The reaction can be carried out, for example, for a time period of 5 minutes to 24 hours.

In a preferred embodiment of the present invention, the process according to the invention is carried out under inert gas, for example under argon or under nitrogen.

If water-sensitive Brønsted base is used as catalyst, it is preferred to dry inert gas and solvent.

In a variant of the process according to the invention, NCO end groups of polyimide (B) according to the invention can be blocked with secondary amine (c), for example with dimethylamine, di-n-butylamine or with diethylamine.

After the porous particles according to the present invention are prepared with the process according to the present invention, the particles may be separated by methods that are known to the skilled artisan, for example filtration, decantation etc. The preferred method is decantation. The separated particles may then be dried, for example at elevated temperature and/or pressure below atmospheric pressure, for example to remove solvent traces.

Porous particles comprising at least one polyimide that are obtained with the process according to the present invention are particularly suitable as insulation material and in vacuum insulation panels.

The present invention therefore also relates to the porous particles obtained with the process according to the present invention.

The porous particles obtained with the process according to the present invention have a particle size of preferably 0.1 to 100 μm, more preferably 0.5 to 50 μm, most preferably 0.5 to 20 μm.

During an optional drying step, the porous particles according to the present invention preferably may generate a porous network, wherein crosslinking among residual groups during drying is also possible. During an optional drying step the porous particles according to the present invention may form a foam. According to a preferred embodiment, this foam is further dried at elevated temperature.

The present invention therefore further relates to the process according to the present invention, wherein after step (B), the porous particles are dried to obtain parts, bodies, foams and/or material, in particular foams, comprising a porous network.

The present invention further relates to porous particles, obtained with the process according to the present invention. These porous particles are preferably spherical and mostly monodisperse. They preferably have nanopores with size from for example 5 to 200 nm, preferably 10 to 100 nm. The porous particles may possess not completely reacted groups, for example isocyanate and/or carboxylic/anhydride groups, which allow crosslinking after or during drying and/or evaporation, which may generate a stable network.

With the porous particles according to the present invention, for example during drying, parts, bodies, foams and/or material can be obtained.

The present invention therefore further relates to parts, bodies, foams and/or material comprising the porous particles according the present invention. A foam that is obtained from the porous particles according to the present invention may have a density of 250 to 700 g/l, preferably 280 to 600 g/l, particularly preferably 300 to 550 g/l.

The present invention further relates to the use of the porous particles according to the present invention or of the parts, bodies, foams and/or material according to the present invention as insulation material and in vacuum insulation.

The invention will be illustrated by working examples.

Materials:
A. Polyisocyanate: Polymeric 4,4'-diphenylmethane diisocyanate ("polymer-MDI"), 2.7 isocyanate groups per molecule, viscosity: 195 mPa·s at 25° C.,
B: Dianhydride: benzene-1,2,4,5-tetracarboxylic dianhydride (Pyromeliytic dianhydride) commercially available as Lupranat® M20 W
Water
Acetone
Silicon-based stabilizer (1)(DC193, silicone polyether copolymer).
Silicon-based stabilizer (2) (DC190, silicone polyether copolymer)

EXAMPLE 1

Synthesis At Room Temperature 10 g of anhydride (B) (0.05 mol), dissolved in 150 g of acetone, were placed in a 250 ml four-neck flask round-bottomed flask having a dropping funnel, reflux condenser, internal thermometer and Teflon stirrer, 1.5 g stabilizer (1) and 2 g of water were added. Then, 40 g (0.12 mol) of polyisocyanate (A) were added dropwise at 20° C. The mixture was stirred (300 rpm) for a six hours under reflux at room temperature. Then it was placed into an open container. After evaporation of the solvent the product turns into yellow foam. The foam was oven-dried for 24 hours at 80° C. under $N_2$ flow. The final product was then analyzed.

Foam density: 415 g/L

EXAMPLE 2

Synthesis At Room Temperature, Molar Ratio Variation 10 g of anhydride (B) (0.05 mol), dissolved in 150 g of acetone, were placed in a 250 ml four-neck flask round-bottomed flask having a dropping funnel, reflux condenser, internal thermometer and Teflon stirrer, 1.5 g stabilizer (1) and 2 g of water were added. Then, 31 g (0.09 mol) of polyisocyanate (A) were added dropwise at 20° C. The mixture was stirred (300 rpm) for a six hours under reflux at room temperature. Then it was placed into an open container. After evaporation of the solvent the product turns into yellow foam. The foam was oven-dried for 24 hours at 80° C. under $N_2$ flow. The final product was then analyzed.

Foam density: 509 g/L

EXAMPLE 3

Synthesis At Room Temperature, Variation Of Stabilizer Amount 10 g of anhydride (B) (0.05 mol), dissolved in 150 g of acetone, were placed in a 250 ml four-neck flask round-bottomed flask having a dropping funnel, reflux condenser, internal thermometer and Teflon stirrer, 3 g stabilizer (1) and 2 g of water were added. Then, 40 g (0.12 mol) of polyisocyanate (A) were added dropwise at 20° C. The mixture was stirred (300 rpm) for a six hours under reflux at room temperature. Then it was placed into an open container. After evaporation of the solvent the product turns into yellow foam. The foam was oven-dried for 24 hours at 80° C. under $N_2$ flow. The final product was then analyzed.

Foam density: 328 g/L

EXAMPLE 4

Synthesis At Room Temperature, Variation Of Water Amount 10 g of anhydride (B) (0.05 mol), dissolved in 150 g of acetone, were placed in a 250 ml four-neck flask round-bottomed flask having a dropping funnel, reflux condenser, internal thermometer and Teflon stirrer, 1.5 g stabilizer (1) and 4.5 g of water were added. Then, 40 g (0.12 mol) of polyisocyanate (A) were added dropwise at 20° C. The mixture was stirred (300 rpm) for a six hours under reflux at room temperature. Then it was placed into an open container. After evaporation of the solvent the product turns into yellow foam. The foam was oven-dried for 24 hours at 80° C. under $N_2$ flow. The final product was then analyzed.

Foam density: 408 g/L

EXAMPLE 5

Synthesis At Room Temperature, Variation Of Agitation Speed 10 g of anhydride (B) (0.05 mol), dissolved in 150 g of acetone, were placed in a 250 ml four-neck flask round-bottomed flask having a dropping funnel, reflux condenser, internal thermometer and Teflon stirrer, 1.5 g stabilizer (1) and 4.5 g of water were added. Then, 40 g (0.12 mol) of polyisocyanate (A) were added dropwise at 20° C. The mixture was stirred (414 rpm) for a six hours under reflux at room temperature. Then it was placed into an open container. After evaporation of the solvent the product turns into yellow foam. The foam was oven-dried for 24 hours at 80° C. under $N_2$ flow. The final product was then analyzed.

Foam density: 296 g/L

EXAMPLE 6

Synthesis At Higher Temperature 10 g of anhydride (B) (0.05 mol), dissolved in 150 g of acetone, were placed in a 250 ml four-neck flask round-bottomed flask having a dropping funnel, reflux condenser, internal thermometer and Teflon stirrer, 1.5 g stabilizer (1) and 2 g of water were added. Then, 40 g (0.12 mol) of polyisocyanate (A) were added dropwise at 20° C. The mixture was heated with stirring to 55° C. The mixture was stirred for a further two hours under reflux at 55° C. After appearance of a yellow suspension the mixture was placed into an open container. After evaporation of the solvent the product turns into yellow foam. The foam was oven-dried for 24 hours at 80° C. under $N_2$ flow. The final product was then analyzed.

Foam density: 426 g/L

EXAMPLE 7

Synthesis At Room Temperature, Variation Of Stabilizer 100 g of anhydride (B) (0.46 mol), dissolved in 1500 g of acetone, were placed in a 4 Liter four-neck flask round-bottomed flask having a dropping funnel, reflux condenser, internal thermometer and Teflon stirrer, 15 g stabilizer (2) and 20 g of water were added. Then, 400 g (1.12 mol) of polyisocyanate (A) were added dropwise at 20° C. The mixture was stirred for a five hours at room temperature. After appearance of a yellow suspension the mixture was placed into an open container. After evaporation of the solvent the product turns into yellow foam. The foam was oven-dried for 24 hours at 80° C. under $N_2$ flow. The final product was then analyzed.

Foam density: 350 g/L

The invention claimed is:

1. A process for preparing a foam comprising a porous polyimide network or porous particles comprising a polyimide network, the process comprising:

reacting a polyisocyariate having on average at least two isocyanate groups per molecule and a polycarboxylic acid comprising a polycarboxylic acid having at least three COOH groups per molecule or anhydride thereof and optionally, comprising a polycarboxylic acid having two COOH groups per molecule or anhydride thereof, in the presence of a solvent and a catalyst to obtain a reaction mixture comprising a hyperbranched polyimide;

continuing the reaction until at least one hyperbranched polyimide having a molecular weight such that precipitation of the at least one polyimide in the form of porous particles from the solvent results and a suspension of porous particles in the solvent is obtained;

separating the porous particles from the solvent and drying the separated porous particles to obtain the porous particles comprising a polyimide network: or evaporating the solvent from the suspension to form the foam comprising the porous polyimide network; and drying the foam;

wherein the polyimide of the separated porous particles and the polyimide of the porous polyimide network have residual carboxylic acid and isocyanate functional groups, crosslinking of the residual functional groups produces a porous network of crosslinked polyimide, and wherein the catalyst is water.

2. The process according to claim 1, wherein the solvent is at least one selected from the group consisting of a ketone, an aromatic compound, a glycol, an ester, a derivative of pyrrolidone, an amide, and a sulfur comprising compound.

3. The process according to claim 1, wherein the reaction of the polyisocyanate having on average at least two isocyanate groups per molecule and a polycarboxylic acid mixture comprising a polycarboxylic acid having at least three COOH groups per molecule or anhydride thereof and optionally, polycarboxylic acid having two COOH groups per molecule or anhydride thereof is conducted at a temperature of from 10 to 200° C.

4. The process according to claim 1, wherein the polyisocyanate is at least one selected from the group consisting of diphenylmethane-4,4'-diisocyanate, diphenylmethane-2,4'-diisocyanate, diphenylmethane 2,2'-diisocyanate and oligomeric diphenylmethane diisocyanate.

5. The process according to claim 1, wherein the polycarboxylic acid is at least one selected from the group consisting of 1,2,3-benzenetricarboxylic acid, 1,2,3-benzenetricarboxylic dianhydride, 1,3,5-benzenetricarboxylic acid (trimesic acid), 1,2,4-benzenetricarboxylic acid (trimellitic acid), trimellitic anhydride, 1,2,4,5-benzenetetracarboxylic acid (pyroellitic acid), 1,2,4,5-benzenetetracarboxylic dianhydride (pyromellitic dianhydride), 3,3',4,4"-benzophenonetetracarboxylic acid, 3,3',4,4"-benzophenonetetracarboxylic dianhydride, benzenehexacarboxylic acid (mellitic acid), and anhydrides of mellitic acid.

6. The process according to claim 1, wherein the polyisocyanate has a concentration in the solvent of from 0.01 to 0.6 mol/l.

7. The process according to claim 1, wherein the polycarboxylic acid has a concentration in the solvent of from 0.05 to 2.0 mol/l.

8. The process according to claim 1, wherein the porous particles are separated from the solvent and then dried to obtain parts, bodies or foams comprising a porous network.

9. A foam comprising a porous polyimide network obtained by the process according to claim 1.

10. An article comprising the foam comprising a porous polyimide network according to claim 9, wherein the article is at least one selected from the group consisting of a part, a body, and a material.

11. The article according to claim 10, wherein the article is suitable as insulation material and vacuum insulation.

12. The foam of claim 9, comprising nanopores of from 5 to 200 nm.

13. The porous particles obtained according to claim 1, wherein the porous particles comprising a polyimide network are suitable as an insulation material and a vacuum insulation.

14. The process of claim 1, wherein the reacting of the polyisocyanate having on average at least two isocyanate groups per molecule and a polycarboxylic acid mixture comprising a polycarboxylic acid having at least three COOH groups per molecule or anhydride thereof and optionally, a polycarboxylic acid having two COOH groups per molecule or anhydride thereof is at a temperature of from 20 to 100° C.

15. The process of claim 1, wherein the solvent is at least one selected from the group consisting of acetone, monoethyl ether acetate, methyl ethyl ketone, methyl isobutyl ketone and N-methylpyrrolidone.

16. The process of claim 1, wherein the precipitated polyimide comprises from 3 to 500 residual carboxylic acid and/or isocyanate functional groups.

\* \* \* \* \*